(12) United States Patent
Becker et al.

(10) Patent No.: US 7,871,126 B2
(45) Date of Patent: Jan. 18, 2011

(54) VEHICLE SEAT WITH ADJUSTABLE SEAT DEPTH

(75) Inventors: Burckhard Becker, Solingen (DE); Wilfried Beneker, Leichlingen (DE)

(73) Assignee: C. Rob. Hammererstein & GmbH & Co. K.G., Solingen (DE)

( * ) Notice: Subject to any disclaimer, the term of this patent is extended or adjusted under 35 U.S.C. 154(b) by 154 days.

(21) Appl. No.: 12/283,071

(22) Filed: Sep. 9, 2008

(65) Prior Publication Data
US 2010/0060058 A1    Mar. 11, 2010

(51) Int. Cl.
*A47C 7/14*    (2006.01)
(52) U.S. Cl. .................................. 297/284.11
(58) Field of Classification Search ............ 297/284.11, 297/284.1, 423.36
See application file for complete search history.

(56) References Cited
U.S. PATENT DOCUMENTS

| | | | | | |
|---|---|---|---|---|---|
| 5,520,438 | A | * | 5/1996 | Stulik | 297/284.11 |
| 5,588,708 | A | * | 12/1996 | Rykken et al. | 297/423.2 |
| 5,599,062 | A | * | 2/1997 | Hagedorn et al. | 297/284.11 |
| 6,375,261 | B1 | * | 4/2002 | Link | 297/284.11 |
| 6,419,317 | B1 | * | 7/2002 | Westrich et al. | 297/284.11 |
| 6,454,353 | B1 | * | 9/2002 | Knaus | 297/284.11 |
| 7,108,322 | B2 | * | 9/2006 | Erker | 297/284.11 |
| 7,597,398 | B2 | * | 10/2009 | Lindsay | 297/284.11 |
| 7,614,693 | B2 | * | 11/2009 | Ito | 297/284.11 |
| 7,669,928 | B2 | * | 3/2010 | Snyder | 297/284.11 |
| 7,669,929 | B2 | * | 3/2010 | Simon et al. | 297/284.11 |

FOREIGN PATENT DOCUMENTS

| | | | |
|---|---|---|---|
| DE | 4104442 A1 | * | 10/1991 |
| DE | 4339114 A1 | * | 5/1995 |
| EP | 1800937 A2 | * | 6/2007 |
| GB | 2252723 A | * | 8/1992 |

* cited by examiner

*Primary Examiner*—David Dunn
*Assistant Examiner*—Tania Abraham
(74) *Attorney, Agent, or Firm*—John Lezdey & Assoc.

(57) ABSTRACT

The seat depth adjustable vehicle seat has a seat frame that has an adjustable front edge and a padding carried by a seat frame. The padding extends about the front edge and adopts different positions with respect to the front edge. The padding has at least two layers. There is provided one inner and one outer layer. The inner layer is located between the front edge and the outer layer.

12 Claims, 3 Drawing Sheets

VEHICLE SEAT WITH ADJUSTABLE SEAT DEPTH

FIELD OF INVENTION

The invention relates to a motor vehicle seat having a seat frame comprising a seat pan. The seat pan has an adjustable front edge. The seat pan further has a padding that extends about the front edge and adopts different positions with respect to the front edge when the seat depth is being adjusted.

Such a vehicle seat has been known from DE 41 04 441 C2. The advantage of this vehicle seat is that a padding can be used, which continuously covers the entire seat pan. By contrast, the vehicle seat known from DE 698 27 303 T2, which is adjustable in the longitudinal direction, has a front and a rear seat part, each of them comprising their own padding, with the distance between these two seat parts being adjusted. As usual, the adjustment direction substantially extends in the x direction, put somewhat more precisely, in the direction of a longitudinal adjustment of the motor vehicle seat. Further, a vehicle seat with adjustable seat depth is known from DE 1 099 866 C1.

In practical use it has been found that, when the prior art vehicle seat is being adjusted, the padding does not always take an ideal shape in the region of the front edge but is instead compressed or locally stretched, makes folds, and that the padding effect is not always uniform.

In view thereof, it is the object of the invention to improve the motor vehicle seat of the type mentioned herein above and to achieve that the padding in the region of the front edge has a regular shape, independent of the respective seat depth adjustment. Preferably, a continuous padding should be used although it is also possible to utilize two or more individual paddings.

This object is achieved by a seat depth adjustable vehicle seat with a seat frame comprising an adjustable front edge and with a padding carried by said seat frame, said padding extending about the front edge and adopting different positions with respect to this front edge, said padding comprising at least two layers, namely an inner and an outer layer, and the inner layer being located between the front edge and the outer layer.

The padding has at least two layers. There are an inner and an outer layer, at least one additional layer can be provided therein between. Preferably, every single layer is biased with a tensioning means of its own, said means keeping the respective layer under mechanical tension for the inner layer to fit against the front edge and for the outer layer to fit against the inner layer. Preferably, the layers have certain tensile strength which is stronger than that of a normal foam body. For this purpose, at least one layer preferably has an armor to which the tensioning means is attached.

By dividing the padding into at least two layers, one obtains improved position and movement of the padding in the region of the front edge. The two layers can be displaced with respect to each other, thus generally adopting, in the region of the front edge, an improved shape over a prior art continuous padding. The inner layer is devised for stronger curvature; the outer layer has a larger radius of curvature than the inner layer. Thanks to the layered structure of the padding, every single layer can be kept under tension on its own. Therefore, it is preferred that each layer be allocated a means for keeping this very layer under tension. The means is preferably configured to be a tension spring and is preferably attached to a free end of the layer.

In a preferred developed implementation, a means for reducing the friction is provided between the at least two layers. This means can be configured differently, for example as a plastic foil, a metal foil, a felt layer, a dimpled sheet or the like. The means can also be kept under mechanical tension just like the layers. Preferably, the layers are configured to be foam bodies. It is preferred that they be surrounded or enclosed in a cover.

It is preferred that the outer layer be covered with a cover fabric which is configured to be very breathable in the preferred embodiment; at least 10% of its surface has holes. This fabric is also referred to as a vented knitted fabric.

Preferably, the two layers have substantially the same thickness. In principle, the one layer can be only 10% as thin as the other one or up to ten times the thickness of the other one. Preferably, the inner layer is ten to 50% thinner than the outer layer so that the higher deformation of the inner layer is better achieved thanks to its smaller radius. Preferably, two layers are being utilized, although three, four and five layers have also been found advantageous. The layers contact each other on a curved contact surface, this contact surface being substantially obtained if one moves at a suited distance about the front edge a straight line extending in the y direction; this is called "body contouring".

The adjustment path usually ranges from 40 to 70 mm. The seat depth mostly ranges between 490 and 560 mm.

Exemplary embodiments will be discussed and described herein after with reference to the drawing; these exemplary embodiments are not limiting; in said drawing:

Figure 1:
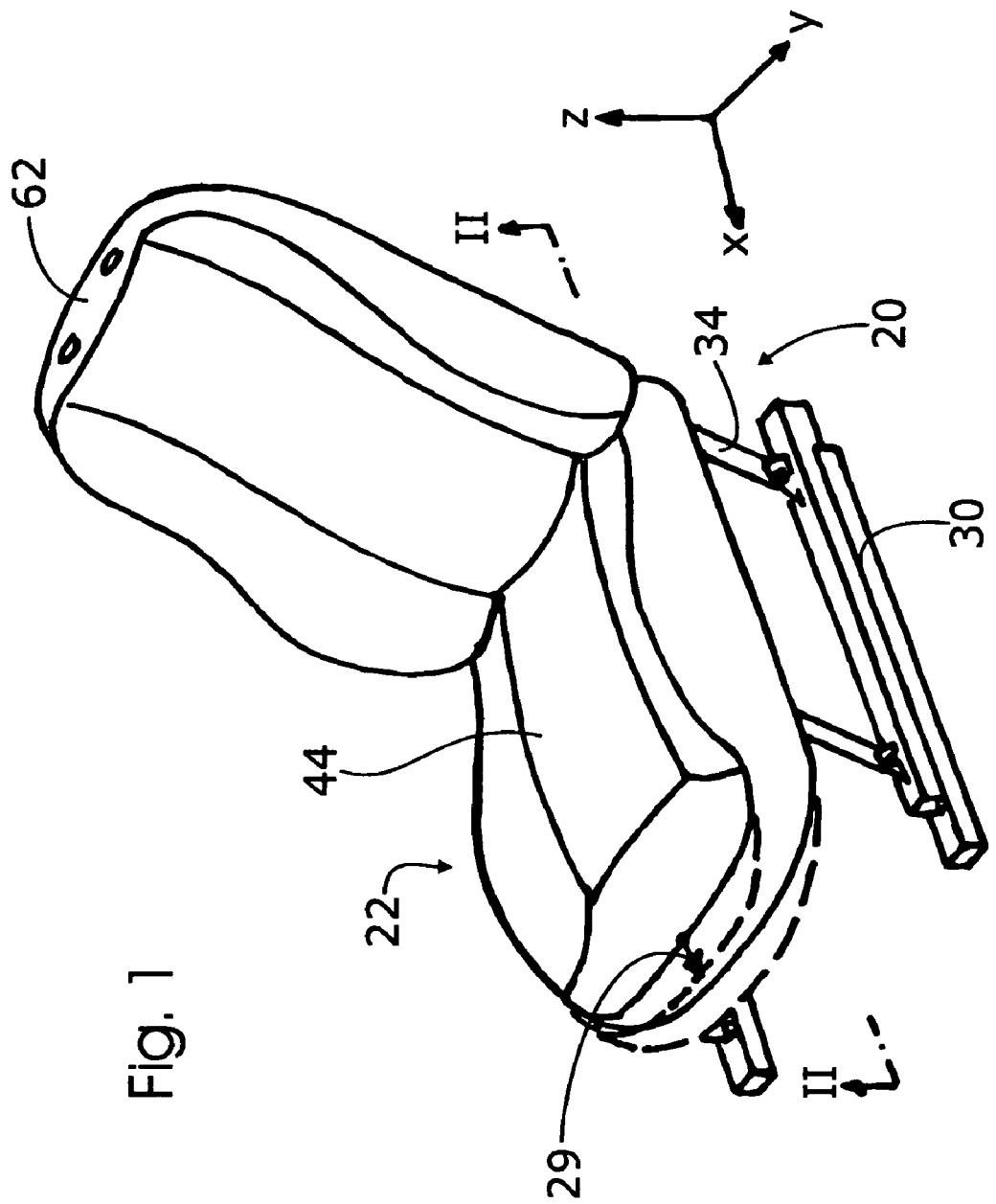
FIG. 1: shows a perspective illustration of a vehicle seat the seat depth of which is adjustable.
Figure 2:
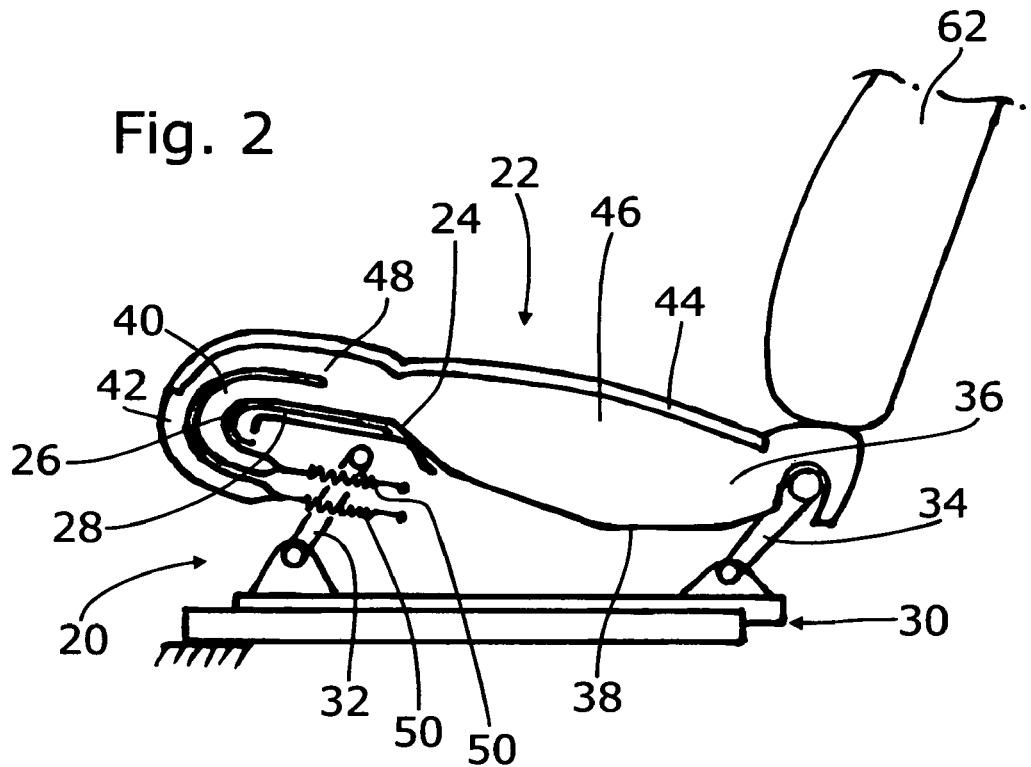
FIG. 2: shows a sectional view taken along section line II-II in FIG. 1; the seat is located in a position in which the adjusted seat depth is shorter.
Figure 3:
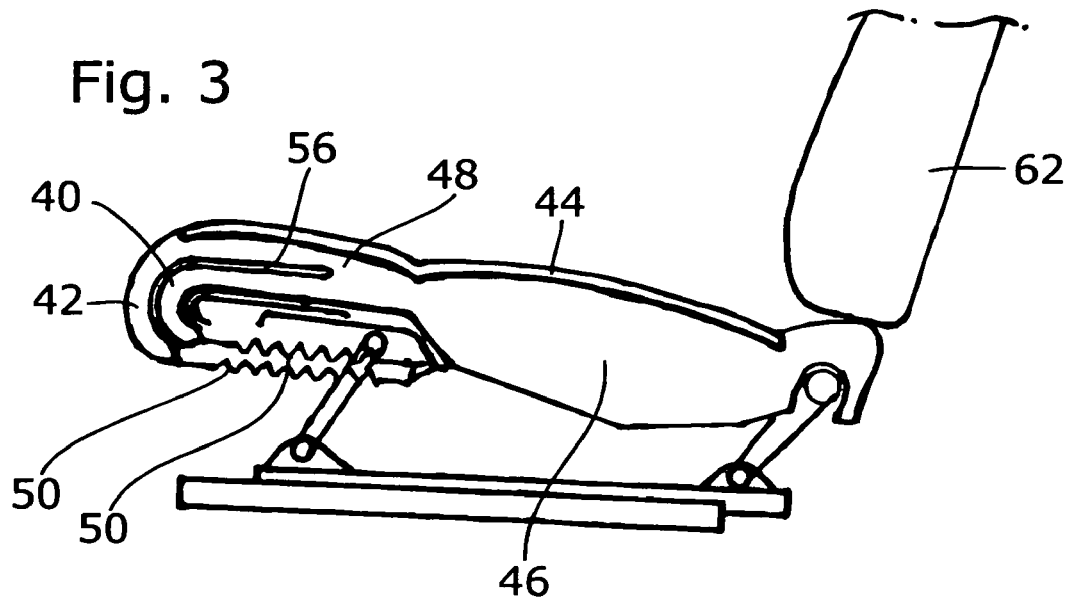
FIG. 3: shows an illustration like FIG. 2, with the seat now being in a position in which the adjusted seat depth is greater.

The first exemplary embodiment according to the FIGS. 1 through 3 will be explained herein after and then the two other implementations will be discussed.

The motor vehicle seat has a seat frame that is connectable to an underbody of the associated vehicle (see e.g., FIG. 2) and that comprises a seat pan 22. The latter has a seat carrier 24 forming a front edge 26 in its front region when viewed in the x direction. Said front edge is rounded, its radius is significantly greater than 10, preferably than 30 mm. The front edge 26 is formed from a plate 28 which is adjustable pursuant to arrow 29. This direction of the seat depth adjustment substantially coincides with the x direction. For corresponding adjustment devices for the plate 28, the reader is referred to the documents DE 41 04 441 C2 and DE 1 099 866 C1 already mentioned herein above as well as to the German Application DE 10 2007 007 195.9 of the applicant. As can be seen from the Figs., the front edge 26 is configured to be a half circle. It could be given other shapes, the curvature preferably extending over 180°.

In a known way, the seat frame 20 further has two pairs of rails 30 for the longitudinal adjustment and front rockers 32 and rear rockers 34. The seat pan 22 further has a padding 36 that is carried by the seat carrier 24. The seat carrier 24 has a sprung base 38 for the padding 36 to rest on.

In the region in which the padding 36 extends about the front edge 26, the padding 36 is made from two layers; it has an inner layer 40 and an outer layer 42. The surface of the outer layer is the normal outer face of the seat; it is covered with a cover fabric 44 that also covers the rest of the top side of the padding 36. The padding 36 has a main body 46; it is located above the sprung base 38 and extends forward in the x direction as far as a transition region 48. In this region, the padding 36 branches into the two layers 40, 42. Irrespective of the adjustment position of the seat pan 22, the transition region 48 always lies behind a plane that extends in the y direction and is defined by the front edge 26. Preferably, the transition region remains behind a plane in the y-z direction that passes through the line in which the curvature of the front edge 26 commences, preferably at least 20-50 mm behind said plane.

The two layers 40, 42 are completely separated from each other over the entire seat width. The parting line between the two layers 40 substantially extends in the y direction. When the seat depth is adjusted, the two layers 40, 42 glide upon each other. For ease of gliding, the surfaces at which the two layers 40, 42 touch each other are lined, covered or designed in another way or there is provided a suited intermediate coat or layer between them. If, in a preferred embodiment, the padding 36, and as a result thereof the two layers 40, 42, are made from foam, the surface of the foam body is covered with a plastic foil, has a coating with a fabric like a nylon stocking, is enclosed in a covering or covered in another way for good gliding properties to be achieved.

As shown in the Figs., the two layers 40, 42 are provided with a tensioning means at their ends; in the exemplary embodiments, tension springs 50 are attached. In the y direction, several such tension springs 50 are provided behind each other for a respective one of the layers 40, 42. The tension springs 50 abut a stationary component part, here the seat carrier 24 (see FIG. 3). Comparing the FIGS. 2 and 3 it appears that the free ends of the two layers 40, 42 adopt different relative positions with respect to each other, depending on the adjustment of the seat depth. The inner layer 40 has the inner path, the outer layer 42 has the outer path, the outer path is longer than the inner path so that, when the seat depth is adjusted, the outer layer 42 is displaced a greater distance than the inner layer 40; this is noticeable in particular at the free end of the respective layer. The free ends of the respective layer 40, 42 are directed in the direction opposite to the arrow 29 or in the negative x direction.

Figure 4:
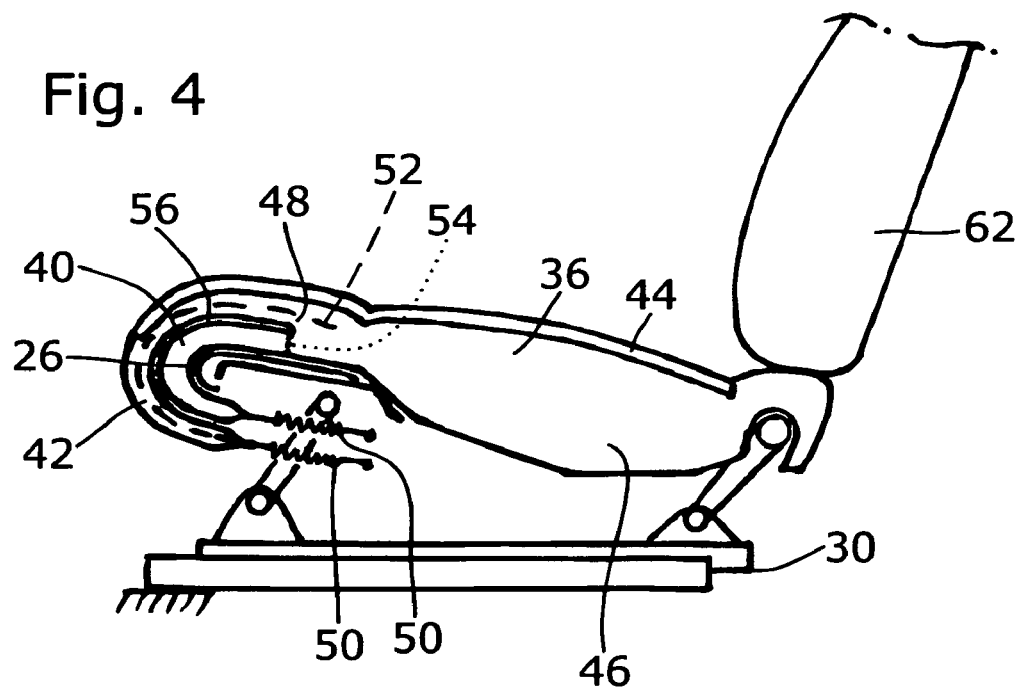
FIG. 4: shows an illustration like FIG. 2, but now in another, $2^{nd}$ implementation.

In the second exemplary embodiment according to FIG. 4, there is provided an armor 52 that is lying within the outer layer 42. It can also lie outside. It is configured to be a cloth made from a tear resistant fabric or plastic material such as a plastic foil. Its function consists in consolidating the foam of this outer layer 42, which actually has no tensile strength, so that tensile forces can be introduced. Plastic meshes, metal grids, at need also elastic material such as a rubber cloth can be used as the armor 52.

The inner layer 40 is also preferably provided with an armor 52.

Further, in the second exemplary embodiment shown in FIG. 4, there is shown an adhesion seam 54 which is located in the transition region 48. When manufacturing the padding 36, the main body 46 and the outer layer 42 are made from one piece. The thus manufactured preform has an area corresponding to the subsequent adhesion seam 54. Further, an inner layer 40 is made separately; it also has a corresponding area. By means of an appropriate adhesive, the two areas are joined together in the region of the adhesion seam 54. It is also possible to glue the outer layer 42 and to form the inner layer 40 as an integral part of the padding 36 or also to join the two layers 40, 42 to the main body 46 through a respective adhesion seam.

Figure 5:
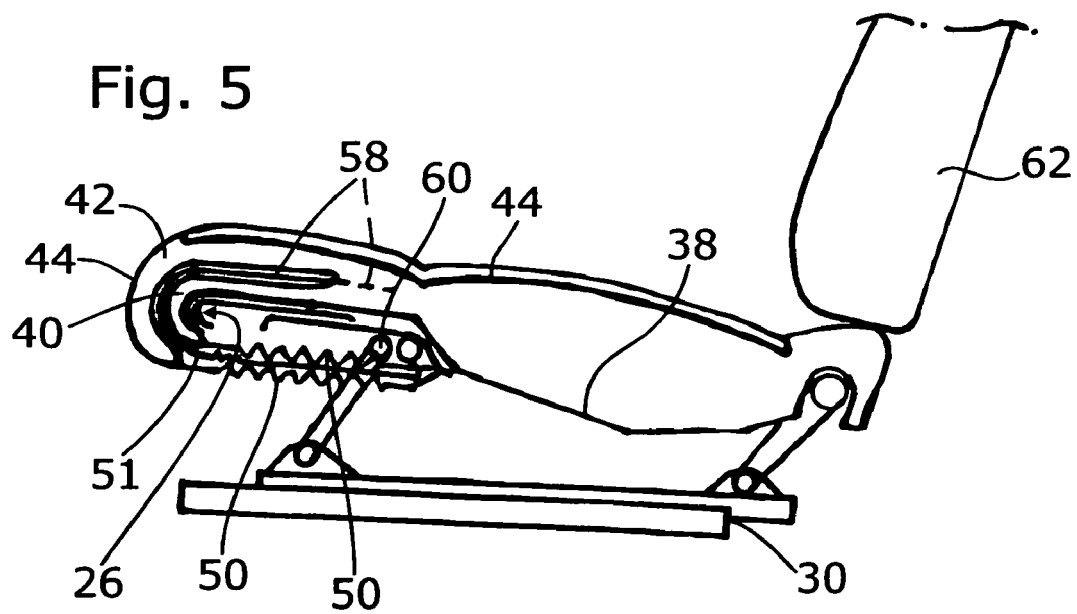
FIG. 5: shows an illustration like FIG. 2 but now in another $3^{rd}$ implementation and with a separate intermediate layer.

In the third exemplary embodiment shown in FIG. 5, there is disposed an intermediate layer 58 between the inner layer 40 and the outer layer 42 and where there is usually located the contact surface 56 between these two layers 40, 42. It extends as far as into the main body 46, as shown in FIG. 5. It is made from a tear resistant flat textile material or from a corresponding web of plastic material. It can also be a dimpled sheet. As shown in FIG. 5, the free downward pointing end of this intermediate layer 58 is tensioned like the free ends of the two layers 40, 42 through own respective springs 50.

In FIG. 5 finally, there is shown a device 60 for adjusting the front edge 26; the devices utilized here belong to prior art. The motor vehicle seat finally has a seat back 62 that is carried by the seat frame 20 and is connected through an appropriate prior art seat back hinge (not shown).

What is claimed is:

1. An adjustable vehicle seat with a seat frame comprising an adjustable front edge and with a padding carried by said seat frame, said padding extending about said front edge and adopting different positions with respect to said front edge, said padding comprising at least two layers consisting of one inner layer and one outer layer and that said inner layer is located between said front edge and said outer layer and every single layer is braced by tensioning means whereby said tensioning means keeps the respective layer under mechanical tension for the inner layer to abut said front edge and that the outer layer abuts the inner layer.

2. The vehicle seat of claim 1, including a means for reducing the friction connected to one layer and interposed between the layers.

3. The vehicle seat of claim 1 wherein the outer layer is lined with a cover fabric on its outer side and that said cover fabric comprises vent ports.

4. The vehicle seat of claim 1 wherein the padding comprises one main body and the at least two layers, said main body being connected to said two layers and said padding integral with only one layer.

5. The vehicle seat of claim 4, a transition area is located between the main body and the at least two layers in a region that is limited by a plane that extends in the x-y direction and passes through the front edge and by a plane that extends parallel thereto and is offset 30 to 150 mm, with respect to the front edge in the negative x direction.

6. The vehicle seat of claim 5 wherein said offset is 70 to 150 mm.

7. The vehicle seat of claim 6 wherein at least one layer comprises an armor to which the tensioning means is attached.

8. The vehicle seat of claim 6, wherein said padding is made at least in part from a synthetic foam.

9. The vehicle seat of claim 1 wherein said seat frame comprises means for adjusting the front edge.

10. The vehicle seat of claim 1 wherein said inner layer has a smaller overall length than said outer layer.

11. The vehicle seat of claim 10 wherein said inner layer is about 5% shorter.

12. The vehicle seat of claim 1 wherein said inner and outer layer can be displaced with respect to each other.

* * * * *